United States Patent [19]

Tinder et al.

[11] 4,230,276

[45] Oct. 28, 1980

[54] HEADLAMP CLEANING ASSEMBLY

[75] Inventors: David V. Tinder, Madison Heights; Walter E. Mack, Livonia, both of Mich.

[73] Assignee: McCord Corporation, Detroit, Mich.

[21] Appl. No.: 708,932

[22] Filed: Jul. 27, 1976

Related U.S. Application Data

[63] Continuation-in-part of Ser. No. 623,798, Oct. 20, 1975, Pat. No. 4,026,473.

[51] Int. Cl.³ .......................... B05B 1/10; B05B 3/14; B08B 3/02
[52] U.S. Cl. .................................. 239/229; 134/179; 134/180; 239/261; 239/283; 239/284 A; 239/288.3; 248/74 B
[58] Field of Search ............... 239/229, 255, 261, 264, 239/265, 273, 275, 280, 282-284, 288-288.5; 134/172, 176, 179-183; 248/56, 62, 65, 74 B; 285/8, 423; 15/250, 250.13, 250.29, 250.31; 138/113

[56] References Cited

U.S. PATENT DOCUMENTS

| Re. 20,782 | 7/1938 | Hooper | 285/8 |
|---|---|---|---|
| 2,417,222 | 3/1947 | Stine | 239/229 |
| 3,117,727 | 1/1964 | Pollock et al. | 239/284 X |
| 3,127,116 | 3/1964 | Pollock et al. | 239/284 X |
| 3,656,691 | 4/1972 | Norstrand | 239/284 |

FOREIGN PATENT DOCUMENTS

| 1806634 | 5/1970 | Fed. Rep. of Germany | 239/229 |
| 718735 | 11/1954 | United Kingdom | 239/229 |

*Primary Examiner*—Andres Kashnikow
*Attorney, Agent, or Firm*—McGlynn and Milton

[57] ABSTRACT

Two embodiments of an assembly for directing a fluid, such as a combination of air and a liquid, toward a vehicle headlamp for cleaning the headlamp surface. A support member is adapted at a first end to be connected to a vehicle body adjacent a headlamp and extends to a forward end which supports a nozzle guide or cage member. The assembly includes an elbow member having a fluid inlet and support flanges for receiving retaining fasteners. A supply tube is connected to the inlet of the elbow. The elbow member has an outlet which extends transversely of the inlet and a flailing flexible tube is connected to the outlet and has a loop integral therewith extending about the elbow member for retaining the flailing tube thereon. The cage member has a terminal end defining an opening and is of generally funnel shape for restricting the flailing movement of the emitting end of the flailing tube. In the second embodiment a cover is disposed over the cage member. The cage members have walls defining a throat surrounding the flailing tube with generally parallel walls below the throat and diverging walls above the throat. The diverging walls are generally V-shaped in cross section adjacent the opening of the cage member and the diverging walls are interconnected by generally parallel connecting walls. Such a cage member configuration results in very effective flailing movement of the flailing tube.

20 Claims, 11 Drawing Figures

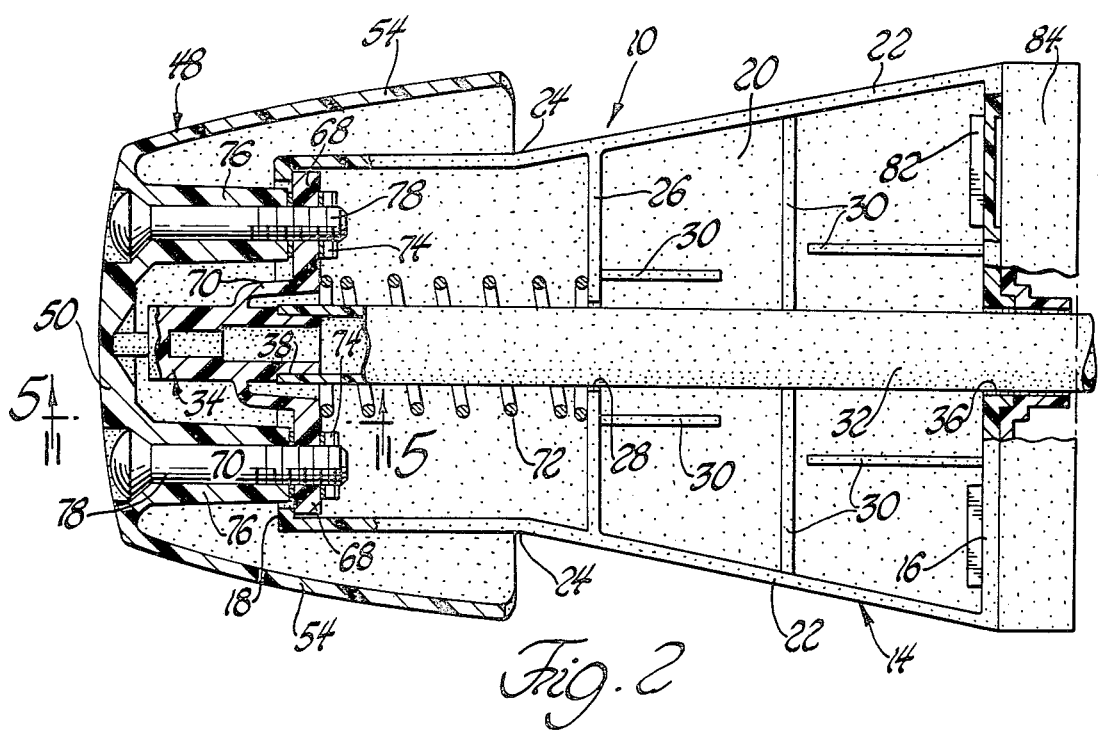
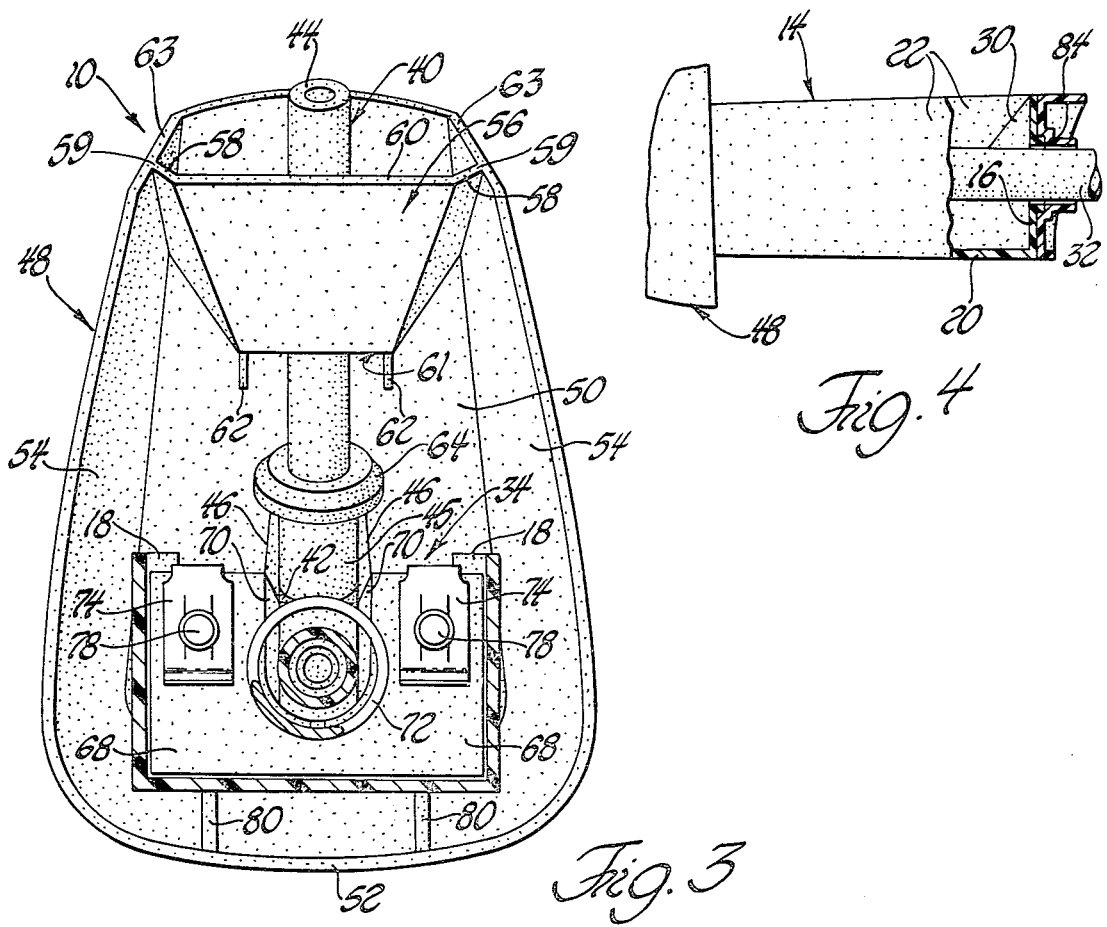

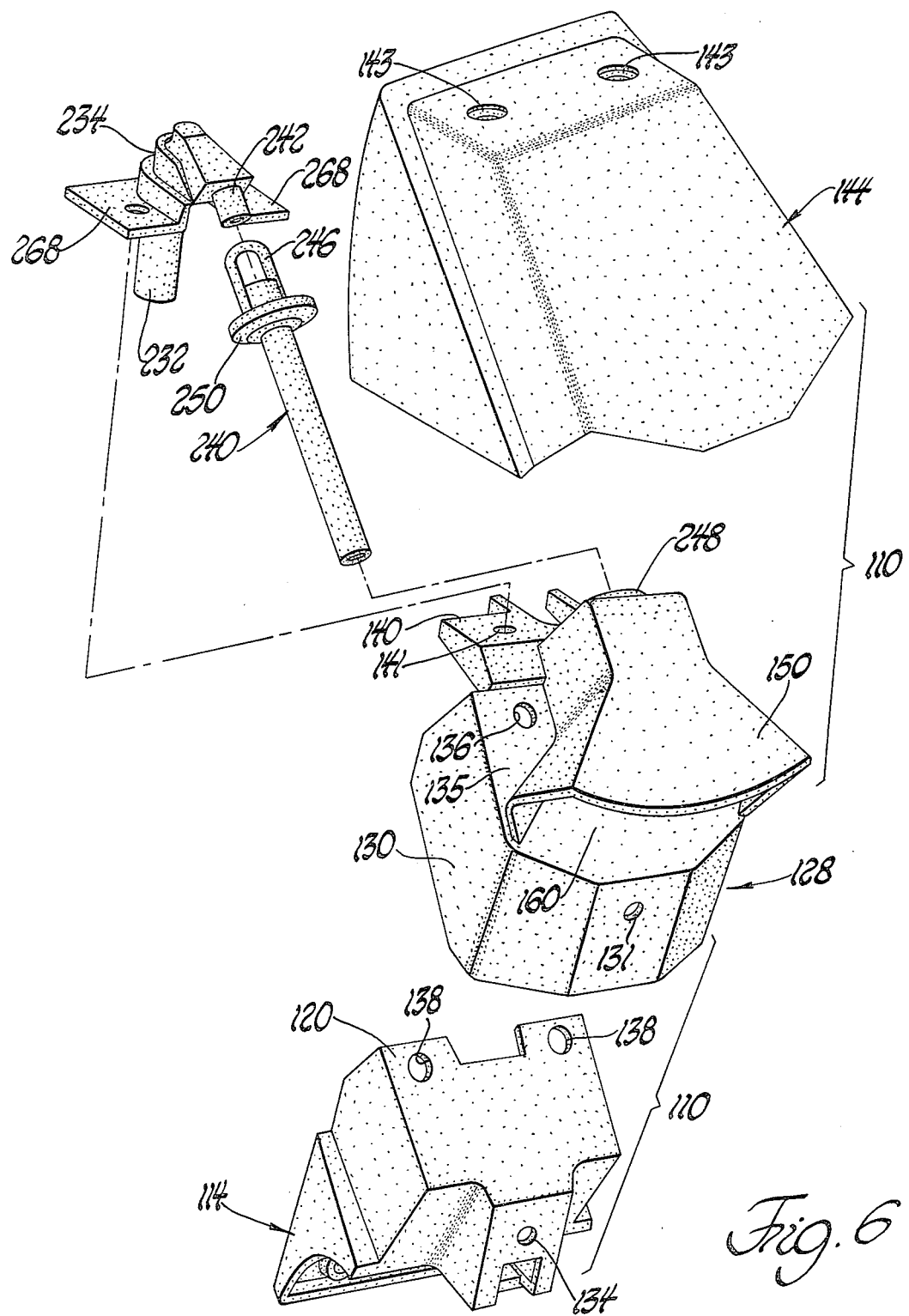

HEADLAMP CLEANING ASSEMBLY

This application is a continuation-in-part of application Ser. No. 623,798, filed Oct. 20, 1975 now U.S. Pat. No. 4,026,473, issued May 31, 1977.

The subject invention relates to a headlamp cleaning assembly of the type for cleaning vehicle headlamps. More specifically, the subject invention relates to a cleaning system of the type utilizing a nozzle defined by a flexible tube having a free end for emitting a high velocity fluid mixture of air and liquid. The tube is anchored at a point spaced from its emitting end and a high velocity fluid mixture of air and liquid is supplied to the tube whereby the end of the tube will flail. The emitting end of the flailing tube is restricted in its movement whereby the emitting end of the tube moves between predetermined limits.

In accordance with the subject invention, there is provided a flailing tube assembly which includes an improved cage means configuration restricting flailing movement of the flailing tube. The assembly includes a support means adapted to be connected to a vehicle body adjacent the headlamp of the vehicle. A cage means extends from the support means and in a direction transverse to the support means. A fluid supply means extends through the support means and the flailing tube is supported by and in fluid communication with the fluid supply means. The flailing tube has an emitting first end for emitting fluid and for flailing in response to such emission of fluid from the emitting end and an anchored second end. The cage means defines an opening surrounding the emitting end of the tube and in spaced relationship to the tube for restricting the flailing movement of the tube to the confines of the opening. The cage means defines a throat spaced from and between the ends of the tube. In a specific and perfecting sense the cage means includes spaced walls which are parallel to the throat and extend through the throat and into diverging portions.

Other advantages of the present invention will be readily appreciated as the same becomes better understood by reference to the following detailed description when considered in connection with the accompanying drawings wherein:

FIG. 2 is a view taken substantially along line 2—2 of FIG. 1 but including an adapter plate which FIG. 1 does not show;

FIG. 3 is a view taken substantially along line 3—3 of FIG. 1;

FIG. 4 is a fragmentary view partially broken away and in cross section of the side of the assembly at the rear end of the support portion thereof showing an adapter plate connected thereto for disposition between the assembly and a vehicle body;

FIG. 6 is an exploded perspective view of a second embodiment of the assembly;

Figure 5:
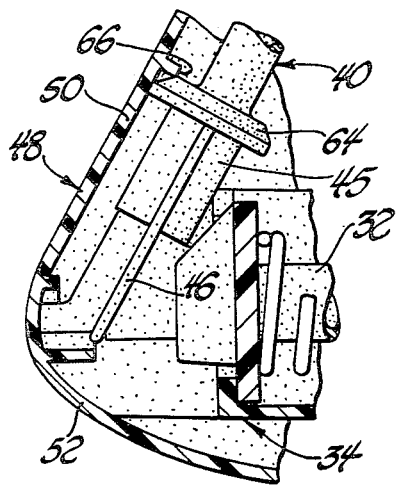
FIG. 5 is a fragmentary cross-sectional view taken substantially along line 5—5 of FIG. 2.
Figure 1:
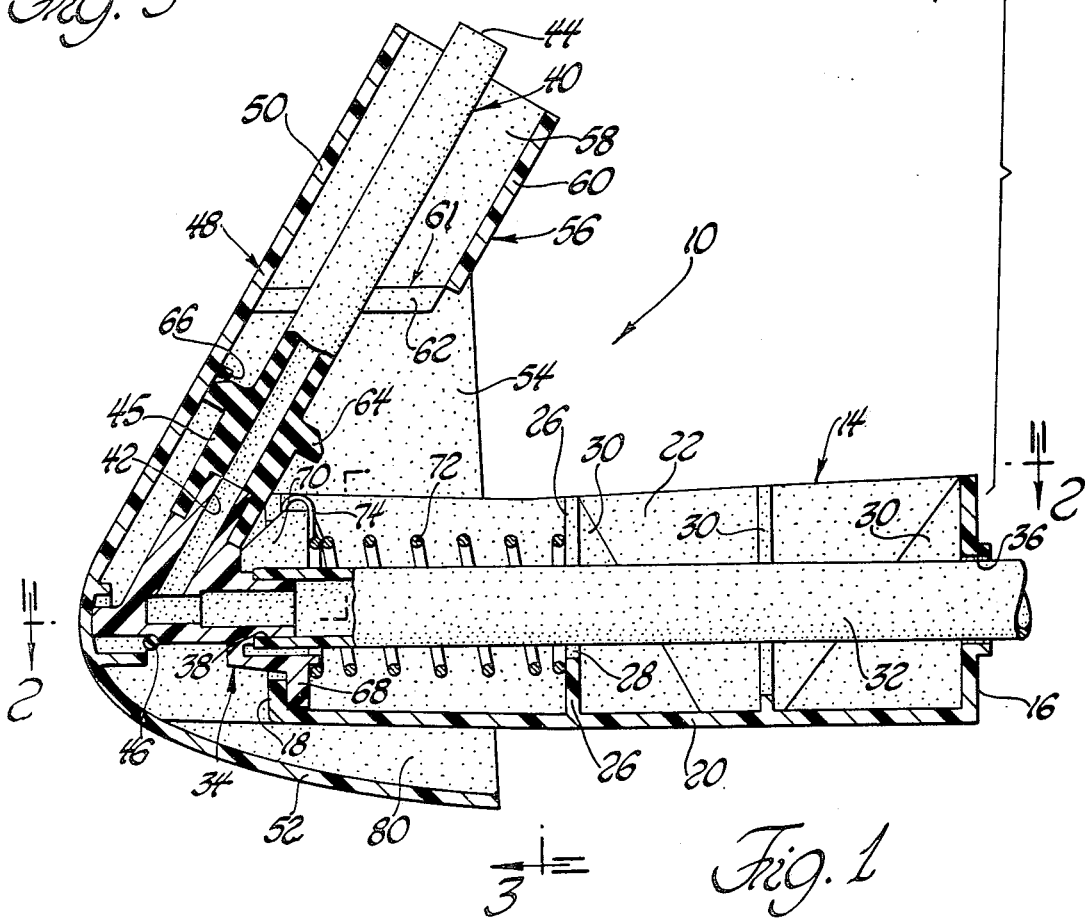
FIG. 1 is a cross-sectional view taken substantially along a longitudinal center line of a first embodiment of the assembly.

A first embodiment of an assembly constructed in accordance with the instant invention for directing a fluid such as a mixture of air and liquid toward a vehicle headlamp is generally shown at 10 in FIGS. 1 through 5. A fragmentary portion of a vehicle headlamp is shown at 12.

The assembly 10 includes a support means defined by the box member generally indicated at 14. The box member 14 is adapted at a first end or rear wall 16 to be connected to a vehicle body adjacent the headlamp 12 and extends forwardly to a second distal end or front wall 18 which is positioned forwardly of the headlamp 12. The box member 14 includes a bottom 20 and side walls 22 extending upwardly therefrom. The side walls 22 taper inwardly toward one another from the outward extremities of the rear wall 16 to a waist area 24 at which point the side walls 22 extend forwardly parallel to one another to the front wall 18. The box member 14 includes an intermediate wall 26 which has a U-shaped recess 28 therein, the purpose of which will become more clear hereinafter. There are also included triangular-shaped reinforcing ribs 30, all of which slant downwardly from the top toward the bottom 20 of the box member 14.

A fluid supply means extends through the box-like member 14 to the distal end 18 thereof. More specifically, the fluid supply means includes a fluid supply tube 32 and an integral elbow member generally indicated at 34. The rear wall 16 of the box member 14 has a circular opening 36 extending therethrough through which the supply tube 32 extends. The supply tube 32 also extends through the U-shaped recess 28 in the wall 26 and since the recess 28 is open at the top the supply tube may be inserted or laid therein. The supply tube 32 is connected to a circular inlet 38 of the elbow member 34.

The inlet 38 of the elbow member 34 is the terminus of the inlet passage which extends into the elbow member 34 and the outlet 42 is the terminus of an outlet passage extending out of the elbow member 34. The outlet passage extends transversely to the inlet passage so as to be disposed at an acute angle relative thereto to extend upwardly and rearwardly relative to the inlet passsage of the elbow member 34.

A flexible flailing tube generally indicated at 40 is disposed over a circular outlet 42 out of the elbow member 34. The flexible tube 40 has an emitting first end 44 for emitting fluid such as a mixture of air and liquid whereby the end 44 flails in response to the emission of the fluid therefrom. The lower end of the tube 40 is an anchored second end 45 disposed over the outlet portion 42 of the elbow member 34 and includes an integral looped strap 46 extending downwardly therefrom and looped about the bottom of the elbow member 34 for retaining the tube 40 on the elbow member 34. The elbow member 34 includes a shoulder against which the looped strap 46 is disposed.

The assembly also includes a cage means defined by the cover member generally indicated at 48 and extending from the distal forward end of the box member 14 and in a direction transverse to the longitudinal axis of the box member 14.

The cover member 48 is an integral member having a front face or wall 50 with a bottom flange 52 extending rearwardly from the front face 50 and a pair of side flanges 54 extending rearwardly from the front face 50 and joined to the bottom flange 52. The front face 50 extends or is inclined upwardly and rearwardly from the bottom flange 52 so that the side flanges 54 are wider at the bottom than at the top. Thus, the cover member 48 has an open rear and open top. Near the top of the cover member 50 is a caged wall generally indicated at 56 having side portions 58 extending rearwardly from the inside of the side walls 54 thereof and inclined inwardly toward one another and a portion 60 generally parallel in cross section to the front face 50 to define an opening in which the flailing tube 40 is disposed. The opening defined by the front face 50, the side flanges 54 and the caged wall 56 is generally funnel-shaped with straight flanges 62 at the bottom thereof to prevent the definition of sharp edges against which the flailing tube 40 could abut.

The side walls 58 and portions 63 of the side flanges or walls 54 define spaced and opposing end walls interconnected by connecting walls 50 and 60 to define cage means including or defining the opening which surrounds the emitting end 44 of the tube 40. These walls also define a throat generally indicated at 61 and spaced from and between the anchored end 45 of the tube 40 and the emitting end 44 of the tube 40. A cross section of the cage means taken parallel to the walls 50 and 60 would show spaced and opposed walls defined by the walls 58 and 63 with parallel portions defined by the flanges 62 extending upwardly toward the emitting end 44 of the tube to the throat 61. These spaced walls extend through the throat 61 and into diverging portions 58 which diverge toward and extend to the opening at the upper extremity of the walls of the cage means. As best viewed in FIG. 3, the spaced walls, at the upper extremities of the diverging portions thereof, are each generally V-shaped in cross section, i.e., in the portions adjacent the opening. The apexes 59 of the V shapes point away from one another as the spaced walls are oppositely disposed. Said another way, the upper extremities of the spaced walls each comprise a pair of planar portions which intersect at an included angle which is less than 180°. Also, the distance between the spaced walls or the apexes 59 thereof is greater than the distance between the connecting walls 50 and 60 whereby the opening is elongated so that the emitting tube 40 flails back and forth between the spaced walls but also bounces off the connecting walls 50 and 60 as it is directed against the connecting walls 50 and 60 by the V-shaped spaced walls.

The flailing tube 40 includes an annular flange or skirt 64 and the front face 50 of the cover member 48 includes a retaining projection or abutment 66 which engages and abuts the skirt 64 to aid in retaining the flailing tube 40 in position.

The front wall 18 of the box member 14 has an aperture or opening therein so that the wall 18 actually forms retaining flanges. The elbow member 34 has integral support flanges 68 extending laterally in opposite directions and disposed within the box member 14 to engage the retaining flanges 18. The inlet 38 to the elbow member 34 is recessed thereinto from the support flanges 68 and, therefore, side walls 70 extend forwardly from the flanges 68 to define the recess.

A biasing means comprising the coil spring 72 is disposed within the box member 14 for reacting between the intermediate wall 26 of the box member 14 and the support flanges 68 of the elbow member 34 for urging the support flanges 68 against the retaining flanges 18 while allowing the elbow member 34 to move rearwardly to compress the spring 72 when the force is applied thereto. The coil spring 72 is disposed about the supply tube 32 whereby the supply tube 32 extends through the longitudinal axis of the coil spring 72.

Each of the support flanges 68 has an aperture therein and a fastener clip 74 disposed over each support flange with a thread receiving aperture therein aligned with the aperture in the support flange. The cover member 48 includes a pair of extensions 76 extending rearwardly from the front face 50 with their terminal ends engaging the support flanges 68 through the metal clip 74. The extensions 76 have bores therethrough and a pair of threaded fasteners 78 extend through the front face 50 of the cover member 48 and through the bores of the extension 76 to threadedly engage the metal clips 74 for connecting the cover member 48 to the elbow member 34. Thus, both the elbow member 34 and the cover member 48 are resiliently connected to the box member 14 defining the support means for movement towards a vehicle body in response to a force applied to the cover member 48 as the spring 72 may be compressed. Upon release of that force the spring 72 will move the elbow member forwardly until the support flanges 68 thereof engage the retaining flanges 18.

As will be appreciated, the cover means is positioned relative to the box member 14 so as to direct the emitting end 44 of the flailing tube 40 toward the headlamp 12 when the box member 14 is connected to a vehicle body to extend therefrom adjacent the headlight 12.

The cover member also includes support ridges 80 extending upwardly from the bottom flange 52 thereof to engage the bottom of the box member 14 for guiding the movement of the cover member 48 rearwardly relative to the box member 14.

The rear wall 16 of the box member 14 includes a rectangular opening on each side of the opening 36 through which a metal clip 82, as shown in FIG. 2, may be inserted to engage the rear wall 16 over another aperture in the rear wall for receiving a threaded fastener screw which threadedly engages the clip 82. The rear face of the wall 16 is recessed for receiving the metal clip so that the metal clip is flush with the rear surface of the wall 16. The rear surface of the wall 16 may abut a vehicle body if the vehicle body is planar. However, different vehicle bodies have different curved configurations and, therefore, the assembly includes an adaptor plate 84 for disposition between the rear walls 16 of the box member 14 and a vehicle body. The adaptor plate 84 accommodates the contour of the vehicle body whereby the box member 14 defining the support means of the assembly may be connected to various different vehicle body contours by utilizing any one of various different adapter plates having an appropriate rearwardly facing configuration or contour. This may be accomplished by extending the threaded fasteners through the vehicle body, through apertures (not shown) in the adapter plate and into threaded engagement with the clips 82.

The supply tube 32 is connected to a supply of fluid such as a mixture of air and water under pressure which flows through the supply tube 32 into the inlet 38 of the elbow member 34 and through a turn of an acute angle into the outlet passage and out the outlet 42 of the elbow member 34 and into the flailing tube 40. As the fluid is emitted from the emitting end 44 of the flailing tube 40, the flailing tube 40 randomly flails within the confines of the opening defined by the cover member 48 and the cage wall 56 so as to direct the mixture onto the surface of the headlamp 12, thereby cleaning the surface of the headlamp 12.

In the event the flailing tube 40 must be replaced, the cover member 48 may be easily removed by removing the threaded screws 78 and replaced with a new flailing tube. In the event a force is applied to the cover member 48 in a rearward direction, the cover member 48, along with the elbow member 34, will move rearwardly to compress the spring 72. When such a force is removed, the spring 72 will return the cover member 48 and the elbow member 34 to the position shown in FIG. 1 with the support flanges 68 of the elbow member 34 engaging the retaining flanges 18 defined by the front wall of the box member 14.

Figure 7:
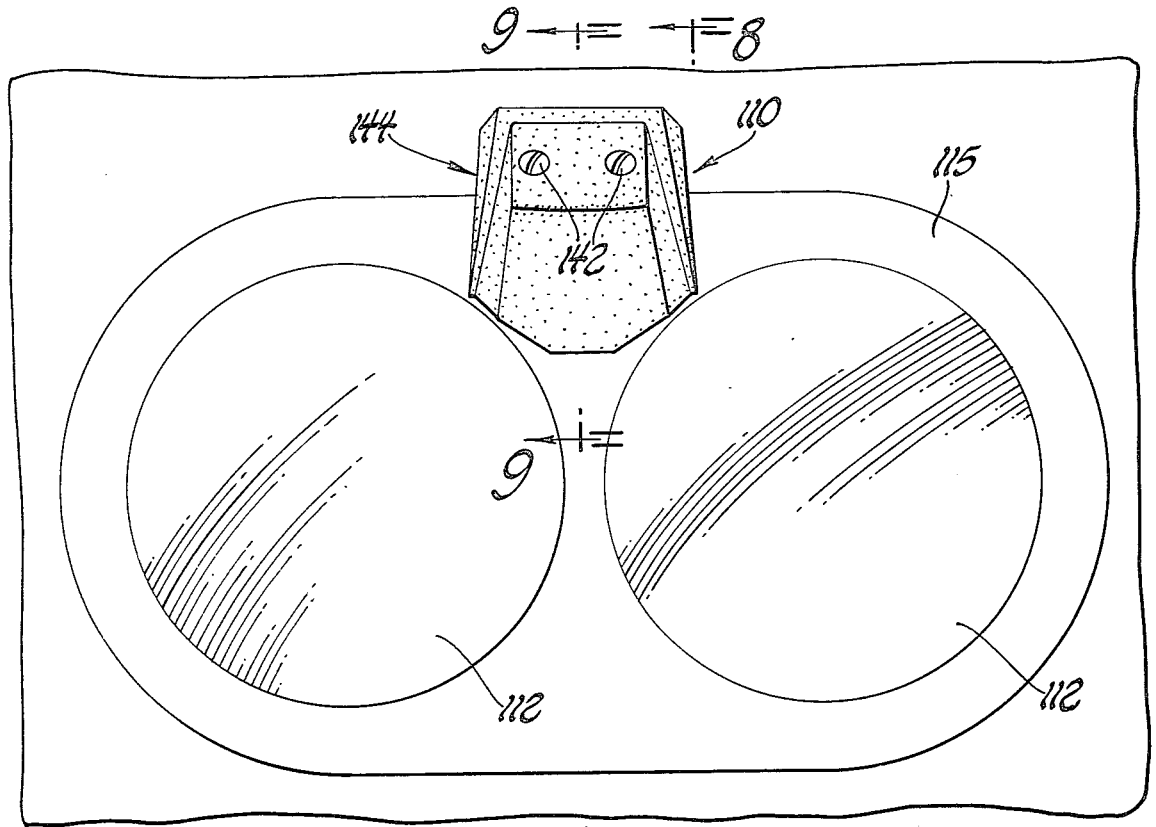
FIG. 7 is a front view of the embodiment of FIG. 6 shown assembled and mounted on a dual vehicle headlamp.
Figure 8:
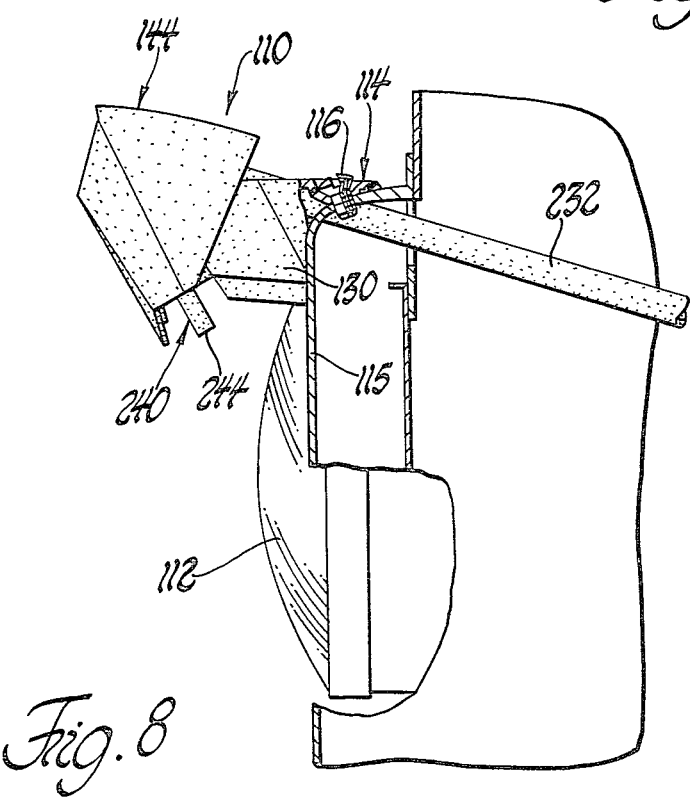
FIG. 8 is a cross-sectional view taken substantially along line 8—8 of FIG. 7 with parts partially broken away.
Figure 9:
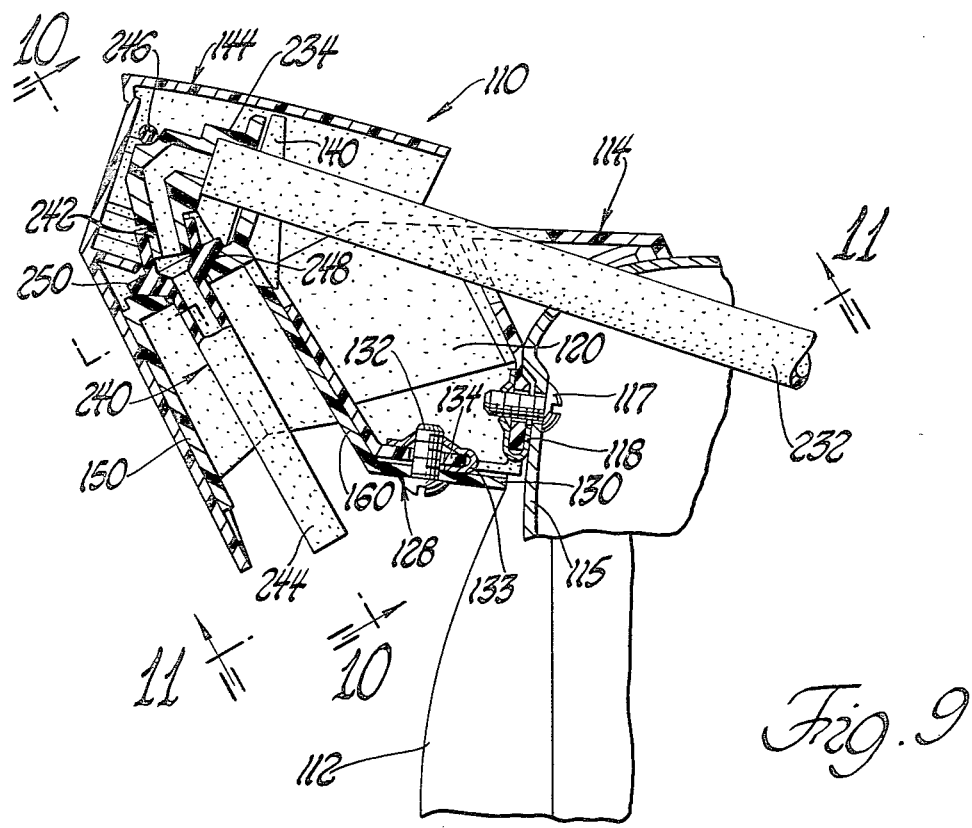
FIG. 9 is an enlarged cross-sectional view taken along line 9—9 of FIG. 7.

A second embodiment of an assembly constructed in accordance with the instant invention is generally shown at 110 in FIGS. 6 through 11. As best shown in FIGS. 7 through 9, the assembly 110 is supported on a vehicle between and above a pair of dual vehicle headlamps 112. In some instances another like assembly 110 will be placed directly below the headlamps 112 as shown in FIG. 7 and pointed upwardly so that each dual headlamp assembly will include two such assemblies which will operate in sequence for cleaning the dual headlamps 112.

The assembly 110 includes a support means defined by the pedestal generally indicated at 114.

The pedestal 114 is adapted to be connected to a headlamp bezel 115 by the screws 116 and 117. The screw 117 threadedly engages a metal threaded clip 118 as it is inserted through the backside of the bezel 115. The rear face of the pedestal 114 is curved to conform with the configuration of the bezel 115.

The pedestal 114 includes a base portion 120 which receives and suppports a nozzle guide member or cage means generally indicated at 128. The cage member 128 includes a skirt 130 which is disposed over the base portion 120 of the pedestal 114 and includes a screw hole 131 through which a screw 132 is disposed to threadedly engage a metal threaded clip 133 as the clip 133 is supported on the planar portion or wall 134 of the pedestal member 114. Further, the cage member 128 includes a wall 135 with holes 136 therein through which screws 137 are disposed to engage threaded clips (not shown) disposed about the holes 138 in the pedestal 114.

The nozzle member or cage member 128 also includes a cover supporting wall 140 having holes 141 therethrough for receiving screws 142 which extend through holes 143 in a cover member generally indicated at 144. The cover member 144 merely covers the entire assembly and provides an aesthetic appearance.

The assembly also includes a fluid supply means comprising a fluid supply tube 232 and an integral elbow member 234. The elbow member 234 includes an outlet 242. The outlet passage or outlet 242 extends transversely to the inlet passage which is in line with the axis of the tube 232 so as to be disposed at an acute angle relative thereto.

The elbow member 234 is like the elbow member 34 previously described and includes integral support flanges 268 extending laterally in opposite directions to engage the walls 140 of the cage member 128 and is held in position as the screws 142 extend through the holes in the flanges 268 of the elbow member 234.

The assembly also includes a flailing tube generally indicated at 240 which includes an anchored end disposed over the outlet 242 of the elbow member 234. The anchored end or second end of the tube 240 includes an integral loop strap 246 extending therefrom and looped about the elbow member 234 for retaining the tube 240 on the elbow member 234. The tube 240 includes an emitting end 244 which flails in response to the emission of fluid therefrom.

The cage member 128 includes an abutment defined by a conical seat 248 and the flailing tube 240 includes an integral annular male conical or frusto conical flange or skirt 250 which is disposed in mating engagement with the seat 248. The seating of the annular flange 250 in the seat 248 determines the position of the longitudinal axis of the tube 240 from the anchored end to the emitting end 244. The axis of the outlet 242 of the elbow member 234 is at a slight angle of approximately 8° relative to the axis of the admitting portion of the tube 240.

Figure 11:
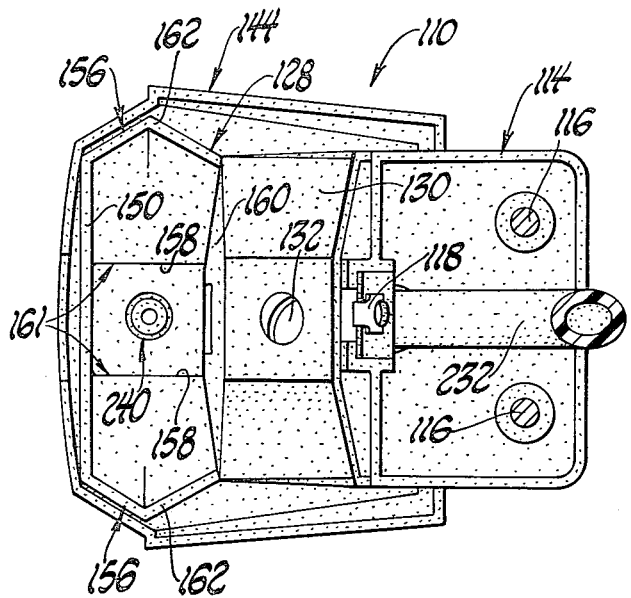
FIG. 11 is a view of the assembly taken along line 11—11 of FIG. 9.

The cage member 128 includes a front face or wall 150 and a rear or back wall 160. The walls 150 and 160 are connecting walls which are generally parallel to one another in cross section but which, as best shown in FIG. 11, may be disposed in planes which diverge from one another in a direction towards the emitting end 244 of the tube 240.

The cage member 128 also includes spaced end walls generally indicated at 156.

The walls 150 and 160 interconnect the spaced walls 156 and the walls 150 and 160 are spaced closer together than are the walls 156 which are disposed in opposing relationship to one another whereby the lower (as shown) terminus of the walls 150, 160 and 156 define an opening surrounding the emitting end 244 of the tube 240.

The spaced walls 156 of the cage member 128 define a throat generally indicated at 161 spaced between the anchored end of the tube 240 and the emitting end 244 of the tube 240.

The spaced walls 156 include parallel portions 158 which extend upwardly in a direction away from the anchored end of the tube 240 toward the emitting end 244 of the tube but only to the throat 161. The walls 156 extend through the throat 161 and into diverging portions 159, which diverging portions 159 diverge from the throat 161 toward the opening of the cage member which surrounds the emitting end of the tube 240. The walls 156 are curved between the parallel portions 158 and the diverging portions 159 as they extend through the throat area 161.

Figure 10:
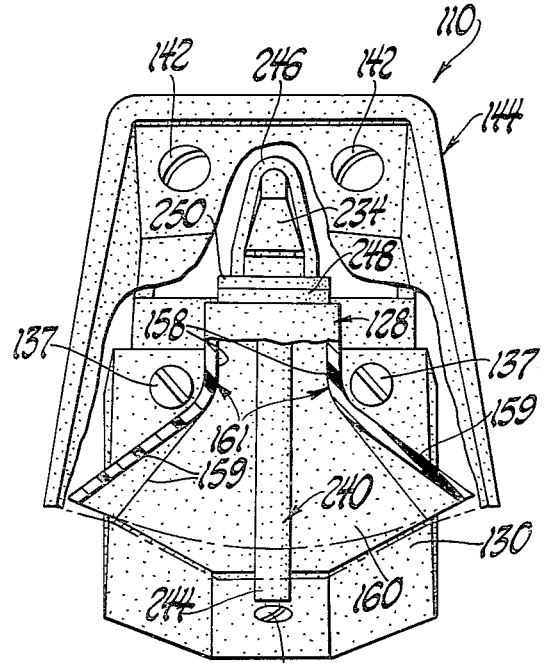
FIG. 10 is a cross-sectional view taken along line 10—10 of FIG. 9 and partially broken away.

The diverging portions 159 are each generally V-shaped as viewed in cross section adjacent the opening of the cage member surrounding the tube 240. As best illustrated in FIG. 11, the apexes 162 of the V shapes are pointed away from one another as the walls 156 are oppositely disposed relative to one another. The V-shaped cross section of the walls 156 increases in depth in a direction from the throat 161 toward the opening of the cage member. In other words, as best illustrated in FIG. 10, the walls 156 are generally flat or planar as they pass through the throat 161 but then begin to take on a V shape configuration which increases in depth to the opening of the cage member. The depth of the V shape cross section is indicated at X in FIG. 10. Said another way, the V shape in the opposed walls 156 decreases in depth in a direction from the opening or terminal end of the cage member in a direction generally toward the anchored end of the tube 240.

The configuration of the cage member which restricts the flailing movement of the flailing tube includes opposing walls which are V-shaped and includes a throat from which the V-shaped walls diverge. The term throat as used herein is used in the dictionary sense as to mean something to resemble the human throat especially in being an entrance, a passageway, a constriction, or a narrowed part, i.e., any narrow, throat-like passage the point at which the flailing tube leaves a passage defined by the cage means as the cage means branches out from the throat. Such a configuration is important and most effective in providing the most efficient flailing movement of the tube. Additionally, such a configuration preserves the life of the flailing tube.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of this invention in which an exclusive property or privilege is claimed are defined as follows:

1. An assembly for directing fluid toward a surface comprising; a flexible tube having an emitting first end for emitting fluid and for flailing in response to such emission of fluid from said emitting end and an anchored second end, cage means defining an opening surrounding said emitting end of said tube and in spaced relationship thereto for restricting the flailing movement of said tube, said cage means defining a throat spaced from and between said anchored end of said tube and said emitting end of said tube so that said cage means diverges from said throat whereby the flailing movement of said tube is more restricted between said throat and said anchored end than between said throat and said opening which surrounds said emitting end of said tube, said cage means including a cross section having spaced walls with parallel portions in a direction extending upwardly toward said emitting end of said tube to said throat.

2. An assembly as set forth in claim 1 wherein said walls extend through said throat and into diverging portions which diverge toward said opening of said cage means.

3. An assembly as set forth in claim 2 wherein said walls are curved between said parallel portions and said diverging portions thereof.

4. An assembly as set forth in claim 2 wherein said diverging portions extend to said opening of said cage means and are each generally V-shaped in cross section adjacent said opening.

5. An assembly as set forth in claim 4 wherein said walls are oppositely disposed relative to one another with the apexes of said V shapes pointing away from one another.

6. An assembly as set forth in claim 5 wherein said cage means includes connecting walls interconnecting at least said diverging portions of said spaced walls.

7. An assembly as set forth in claim 6 wherein said connecting walls are generally parallel to one another in cross section.

8. An assembly as set forth in claim 7 wherein said V shape increases in depth in a direction from said throat to said opening.

9. An assembly for directing fluid toward a surface comprising; a flexible tube having an emitting first end for emitting fluid and for flailing in response to such emission of fluid from said emitting end and an anchored second end, cage means defining an opening surrounding said emitting end of said tube and in spaced relationship thereto for restricting the flailing movement of said tube, said cage means defining spaced and opposed walls on opposite sides of said tube, each of said walls being generally V-shaped in cross section adjacent said opening.

10. An assembly as set forth in claim 9 wherein said spaced walls are interconnected by connecting walls.

11. An assembly as set forth in claim 10 wherein the distance between said spaced walls is greater than the distance between said connecting walls.

12. An assembly as set forth in claim 11 wherein said V shape in said spaced walls decreases in depth in a direction from said opening generally toward said anchored end of said tube.

13. An assembly as set forth in claim 11 wherein said spaced walls diverge from one another in a direction toward said opening.

14. An assembly as set forth in claim 13 wherein said connecting walls are generally parallel to one another in cross section.

15. An assembly for directing fluid toward a surface comprising; a flexible tube having an emitting first end for emitting fluid and for flailing in response to such emission of fluid from said emitting end and an anchored second end, cage means defining an opening surrounding said emitting end of said tube and in spaced relationship thereto for restricting the flailing movement of said tube, said tube including an integral flange extending radially therefrom, said cage means including an abutment engaging said flange for retaining said tube in said anchored position.

16. An assembly as set forth in claim 15 wherein said flange extends annularly about said tube.

17. An assembly as set forth in claim 16 wherein said abutment comprises an annular seat for engaging said flange.

18. An assembly as set forth in claim 17 wherein said annular seat is conical and said flange includes a mating conical surface.

19. An assembly as set forth in claim 15 including an elbow member having an inlet passage and an outlet passage extending transversely thereto, said second end of said tube being in fluid communication with said outlet passage.

20. An assembly as set forth in claim 19 wherein said tube includes a looped strap extending therefrom and about said elbow member for retaining said tube in said anchored position.

* * * * *